Aug. 3, 1965  R. G. STACY  3,198,294
BRAKE SHOE FASTENERS
Filed Dec. 26, 1963

INVENTOR.
ROBERT G. STACY
BY
Douglas R. McKechnie
ATTORNEY

United States Patent Office 3,198,294
Patented Aug. 3, 1965

3,198,294
BRAKE SHOE FASTENERS
Robert G. Stacy, Meadowbrook, Pa., assignor to The Budd Company, Philadelphia, Pa., a corporation of Pennsylvania
Filed Dec. 26, 1963, Ser. No. 333,366
15 Claims. (Cl. 188—234)

This invention relates to improvements in brake shoes for use in disk brakes on railway cars and, more particularly, to improvements in brake shoes of a type similar to that shown in U.S. Patent 2,451,326—Eksergian et al. to which reference can be had for a more detailed description.

The above patent discloses a brake shoe comprising a removable brake lining pressed against a plurality of resilient pads and mounted on a rigid backing plate by a plurality of projections or studs having removable wires passed therethrough. The brake lining comprises a plurality of blocks of suitable friction or braking material bonded to a flexible sheet metal backup plate. During braking, the braking reaction torque is transmitted from the brake lining to the backing plate by means of the studs, and the block can tilt slightly, because of the resilient pads and flexible backup plate to equalize braking pressures thereon.

Such brake shoes have been used by the railway industry for a number of years and, while the brake shoes have been highly successful and satisfactory, they nevertheless have certain features which the present invention is designed to improve. First, it was thought initially that a brake lining could be used until the blocks wear down to the studs. However, it has been found that this cannot be done because the bases of the blocks act as heat insulators, and, if they are allowed to wear down too far, the resilient pads burn out during braking due to the high temperatures developed. Consequently, the practice has arisen of replacing the brake lining when the blocks wear down to a thickness of no less than 3/16 of an inch. But, when the blocks are this thick, their outer faces are spaced outwardly of the studs, so the brake linings do not have as great a life as possible under the existing space bounds. Accordingly, one of the objects of the invention is to provide a brake shoe having a removable brake lining possessed of a longer life than that heretofore available.

As previously indicated, the prior art brake linings are mounted on the backup plate and pressed against the resilient pads by studs having removable wires passed therethrough. The size of the wires and the holes through which they are passed is somewhat critical since the brake lining has to be held pressed against the pads so as to place them in compression, in order to prevent vibration under running conditions. However, it happens quite often that the holes became enlarged, after prolonged periods of use, whereby the brake lining vibrates. It also happens that when new brake linings replace old worn out ones, the unskilled repairmen, not realizing the essential nature of the proper sized wire, often use undersized wires and thus fail to place the pads in compression so that the brake lining is sloppy and free to vibrate. Once vibration begins, the situation worsens since the vibratory action of the wire in the hole peens the hole to enlarge it and this in turn allows greater freedom of vibration. Thus, another object of the invention is to provide a brake shoe wherein the brake lining is attached in such a manner as to minimize the effects of vibration and to avoid the use of fasteners that are critical as to their size.

Another object is to provide a relatively thin resilient pad and backup plate for increasing the life of the brake lining, the pad and lining being mounted in such a manner as to provide a relatively large degree of freedom of tilting movement for equalizing braking pressures on the blocks.

Still another object is to provide a removable brake lining which, although free to vibrate slightly, is constructed so as to prevent excessive wearing of any parts it rubs against.

A further object is to provide a brake shoe having parts that do not loosen or become sloppy even though they are free to vibrate and move slightly relative to each other.

A still further object is to provide a brake shoe having a removable brake lining that is mounted in resilient suspension for movement towards and away from the backing plate so as to provide the necessary tilting action for equalizing braking pressures and to allow the brake lining to vibrate slightly and minimize the effects of shock thereon.

Briefly, the invention comprises a brake lining adapted to be resiliently mounted on a rigid backing plate by a rubber-like cushioning pad pressed between the brake lining and the plate and by a plurality of spring elements biasing the brake lining in opposition to the pad. The brake lining is guided for limited movement towards and away from the backing plate under the restoring forces of the bias of the pad and spring elements.

Other objects and advantages will be apparent from the following description taken in connection with the accompanying drawing wherein.

Figure 4:
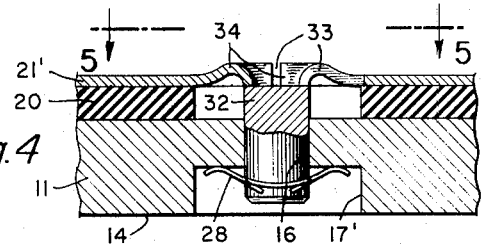
Figure 5:
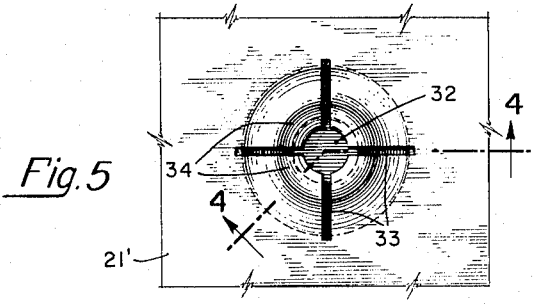
Figure 6:
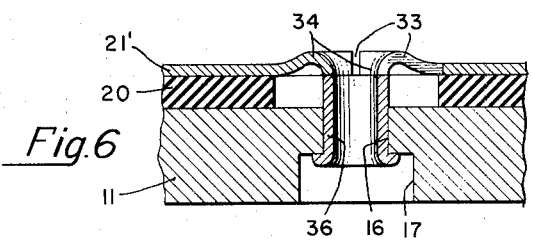
Figure 2:
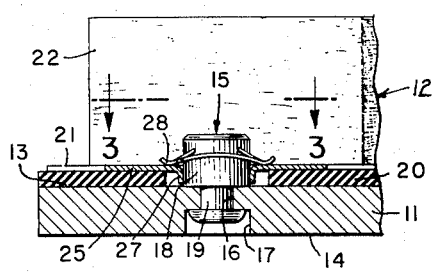
FIG. 2 is an enlarged sectional view taken along lines 2—2 of FIG. 1.
Figure 7:
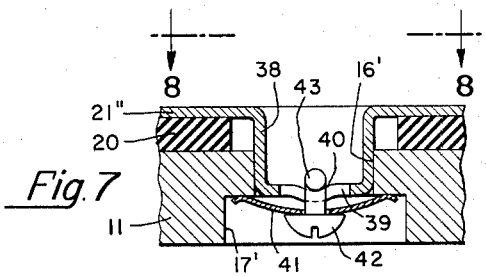
Figure 3:
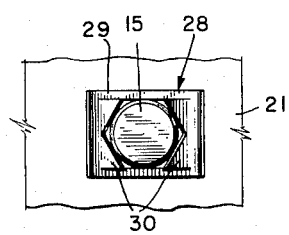
FIG. 3 is an enlarged detail view looking generally along lines 3—3 of FIG. 2.
Figure 8:
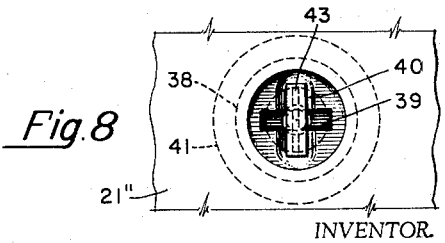

FIGS. 4 and 5 are enlarged views, similar to FIGS. 2 and 3, of another embodiment of the invention, FIGS. 4 and 5 looking along lines 4—4 and 5—5 of FIGS. 4 and 5 respectively;

FIG. 6 is an enlarged view similar to FIG. 2 of still another embodiment of the invention;

And FIGS. 7 and 8 are enlarged views similar to FIGS. 2 and 3 of still another embodiment of the invention, FIG. 8 looking along line 8—8 of FIG. 7.

Figure 1:
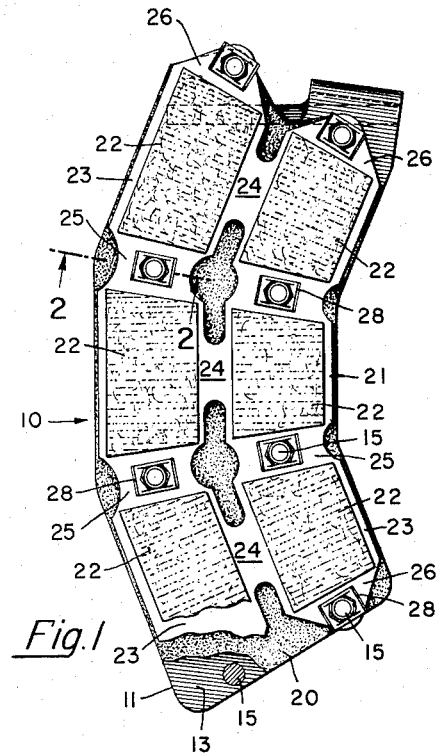
FIG. 1 is a face view, with portions removed, of a brake shoe embodying the invention.

Referring now to the drawings, FIGS. 1-3 illustrate a brake shoe 10 adapted to be mounted, in a conventional manner, on a brake head for coaction with a brake disk or rotor, the brake shoe comprising a rigid, arcuate backing plate 11 on which is mounted a removable brake lining 12.

The backing plate 11 is preferably of pressed steel and has flat, parallel front and back faces 13 and 14 respectively. Back face 14 is adapted to abut a cooperating surface on the brake head in the usual manner so as to press, upon the application thereto of a brake applying thrust, the brake shoe against the brake disk upon movement of the brake head towards the disk. Backing plate 11 is provided with a plurality of holes in which a plurality of studs 15 are mounted. As shown in FIG. 2 each hole comprises a bore 16 having an enlarged counterbore 17 extending through the rear face 14, and each stud 15 comprises an enlarged head 18 that extends normal to the front face 13 and a shank 19 that extends through bore 16 and is upset at its rear end so as to rigidly secure the stud to the backing plate.

Front face 13 abuts a rubberlike pad 20, preferably of a silicone rubber. The pad is flat, it is of an arcuate shape similar to the shape of face 13, and it is provided with a plurality of holes through which the heads 18 of studs 15 extend. Thus, the studs not only align the pad when it is assembled but they would also be effective to limit movement of the pad along surface 13 if the pad were free to so move.

Brake lining 12 comprises a flexible, sheet-steel, stamped backup plate 21 having a plurality of segments or blocks 22 mounted thereon in conventional manner, either by riveting or bonding. In the illustrated embodiment, there are three angularly spaced pairs of radially spaced blocks 22 providing inner and outer diameter end and middle segments. The blocks 22 are of any suitable conventional braking or friction material, preferably woven or molded.

Backup plate 21 is cut out to define a plurality of sections 23 to which blocks 22 are attached, a plurality of radial connecting portions 24 extending between radially adjacent sections 23, a plurality of circumferential connecting portions 25 extending between circumferentially adjacent sections, and a plurality of tapered end tabs 26. The backup plate also comprises a plurality of rearwardly extending bearing sleeves 27 on the portions 25 and tabs 26. Sleeves 27 are cylindrical and tubular and are fitted over the heads of studs 15 whereby the studs allow or guide the plate for movement normal to the plate 11 and restrain movement parallel thereto. Except for sleeves 27, backup plate 21 is flat.

Pushed onto studs 15 and pressing backup plate 21 against pad 20 are a plurality of spring tension fasteners 28. As best seen in FIG. 3, each fastener comprises a rectangular annular base portion 29 and a pair of prongs 30 which extend towards each other from opposite sides of the base and are provided with V-shaped notches that engage head 18 in such a manner that the prongs and base are stressed so as to place the studs in tension and bias backup plate 21 against pad 20 with a force that is balanced and opposed by the bias of pad 20 on the backup plate. Thus, the backup plate is resiliently suspended and normally occupies a neutral or balanced position from which it is free to move towards or away from backing plate 11 under braking, vibratory and shock forces. In the prior art, this movement was only towards the backing plate.

The purpose of pad 20 is to allow each of the blocks 22 to tilt slightly and accommodate their outer surfaces to the brake disk to thereby develop equal pressure over the faces of the blocks and prevent any localized overheating. To aid this tilting action, the individual sections 23 are interconnected through flexible connecting portions which allow the individual sections to act independently of each other. The purpose of providing the spring tension fasteners is to prevent any loosening of the brake lining due to vibrations and to provide spring tension resiliency that allows vibration without parts banging against one another.

In operation, when the brakes are applied, the faces of blocks 22 engage the brake disk whereby the braking reaction forces are transmitted into the backup plate. The bearing sleeves 27 transfer the braking reaction forces into studs 15 and backing plate 11. Thus the bearing sleeves not only increase the area over which such forces are transmitted into studs 15, but they also provide sufficient bearing surfaces to allow the backup plate 21 to freely slide along the studs without scraping, gouging or marring them.

As previously indicated, one of the objects of the invention is to provide a brake lining of greater life than that available in the prior art devices over which the invention is an improvement. This object is accomplished by providing a backup plate and pad each of one half the thickness of the prior art members. By decreasing this thickness, the thickness of the base of each block which acts as a heat insulator to prevent burning of the pad, is increased whereby the blocks can be worn down to studs 15. It should also be noted that in decreasing the thickness of the backup plate and pad, the blocks still have as great a degree of tilting movement as they had in the prior art since the resilient suspension of the backup plate between the spring fasteners and the pad permits the backup plate to move outwardly as well as inwardly. In the prior art devices, the backup plates could only move inwardly.

FIGS. 4 and 5 illustrate another embodiment of the invention wherein the brake lining comprises a backup plate 21' provided with a plurality of integral solid studs 32 which extend rearwardly from the backup plate through bore 16 and terminate in counterbore 17', which is larger than the counterbore illustrated in the embodiment of FIGS. 1–3 so as to receive a fastener 28, as shown. Backup plate 21' comprises four slots 33 defining four arcuate, sector-shaped, resilient fingers whose free ends are welded to stud 32.

In this embodiment, each fastener 28 pulls downwardly on a stud 32, as viewed in FIG. 4, to place it in tension and thereby bend fingers 34 to force backup plate 21 against pad 20. Thus, the reaction force to the compression of pad 20 is taken up by two spring systems, one of which is the result of fasteners 28 and the other of which is due to resilient fingers 34. With such an arrangement, blocks 22 are free to tilt slightly and studs 32 can move inwardly and outwardly through bore 16 without being scoured. Furthermore, the braking reaction forces are transmitted through backup plate 21' and fingers 34 into studs 32 and backing plate 11.

The embodiment illustrated in FIG. 6 is similar to that illustrated in FIGS. 4 and 5 except that a backup plate 21' is provided with a plurality of tubular studs 36 which extend through bores 16 and have their rearward edges upset, as shown, to limit outward movement of the stud relative to bore 16. In this case though the backup plate 21' is still free to move both inwardly and outwardly relative to backing plate 11, because of resilient fingers 34.

In the embodiment illustrated in FIGS. 7 and 8, a backup plate 21" is provided with a plurality of cup shaped studs 38 which extend into bores 16' of the backing plate 11. Each of the studs 38 has a rear wall provided with a transverse slot 39 and a groove 40 that extends at right angles to slot 39. Plate 21" is secured by a pluarality of fasteners each of which comprises a Belleville spring 41 having a central hole through which a rotatable fastener extends, the fastener comprising a slotted head 42 adapted to be rotated by a screwdriver and a T-shaped portion 43 adapted to be inserted through slot 39 and turned 90 deg. so as to seat in groove 40. The bias of springs 41 forces plate 21" against pad 20, and the backup plate 21" is free to move inwardly and outwardly due to the resilient suspension thereof between the pad and springs 41.

It should be noted that in the embodiments illustrated in FIGS. 4–8, there is no stud that extends outwardly of face 13 so that the blocks 22 can be worn down to their lower limits, i.e., ¾₁₆". The customary size of studs 15 is such that although the life of the brake lining has been increased over the prior art, there still remains a certain amount of life left in the blocks before which the pad would burn out. Thus, in the latter embodiments, the brake lining life is greater than that in the first embodiment.

It should be noted that while the invention has been applied to a brake lining having a one piece backup plate 21, the invention is also applicable to removable brake linings, such as shown in U.S. Patent 2,904,138—Wilson, which comprises a plurality of backup plates each bonded to a different block, and a retaining plate. With such an arrangement, the fasteners here disclosed would be applied to the retaining plate.

It will be also apparent to those skilled in the art that many other arrangements can be devised without departing from the scope of the invention as defined in the appended claims.

What is claimed is:

1. For use in a brake shoe having a rigid backing plate, the combination comprising: a pad of rubberlike material adapted to be pressed against said plate; a brake lining adapted to press said pad against said plate; a plurality of projections adapted to extend between said plate and said brake lining; and a plurality of spring elements connected to said projections and adapted to bias said brake lining in opposition to said pad whereby said brake lining is movable from a balanced position both towards and away from said plate against the bias of said pad and said spring elements respectively.

2. For use in a brake shoe having a rigid backing plate, the combination of: a rubberlike pad means adapted to be pressed against said plate; a brake lining adapted to press said pad means against said plate; a plurality of studs adapted to extend perpendicular to said plate and transmit brake reaction forces thereto from said brake lining; and a plurality of spring elements adapted to be connected to said studs for biasing said brake lining against said pad means whereby said brake lining is resiliently suspended for movement from a balanced position in both directions normal to said plate.

3. For use in a railway disk brake having a brake shoe comprising a rigid backing plate, the combination of: a removable brake lining adapted to be disposed adjacent to said plate; and means adapted to mount said brake lining on said plate in such a manner that said brake lining is restrained from moving parallel to said plate but is free to move normal to said plate, said means comprising a rubberlike pad compressed between said brake lining and said plate, a plurality of guides extending between said brake lining and said plate and adapted to be affixed to one of them, and a plurality of deflected spring elements connected to said guides and biasing said brake lining in balanced opposition to said pad.

4. For use in a railway disk brake provided with a brake shoe having a rigid backing plate adapted to receive a brake applying thrust and the braking torque resulting therefrom, the combination of: a brake lining adapted to be disposed adjacent to the backing plate; and means adapted to resiliently support said brake lining on said backing plate, said means comprising a rubberlike pad adapted to be disposed between said brake lining and the backing plate, a plurality of studs adapted to transmit the braking torque from said brake lining to the backing plate, and a plurality of spring elements connected to said studs and adapted to compress said pad between said brake lining and the backing plate, whereby said brake lining is resiliently suspended by said pad and spring elements for slight movement from a balanced position towards and away from the backing plate.

5. The combination of claim 4 wherein said brake lining comprises a plurality of blocks of friction material and a sheet metal plate for transmitting the braking torque into said studs.

6. The combination of claim 5 wherein said sheet metal plate is flat and said blocks are affixed to said plate, said plate having a plurality of sections interconnected by connecting portions that allow said sections to tilt independently of each other.

7. The combination of claim 6 wherein said studs are integral with said sheet metal plate.

8. The combination of claim 7 wherein said spring elements comprise a plurality of arcuate, spring fingers formed from said sheet metal plate and connected to said studs.

9. The combination of claim 7 wherein said studs are adapted to extend through bores in said backing plate, each bore providing a bearing surface allowing sliding movement of said stud associated therewith.

10. The combination of claim 8 wherein said studs are adapted to be upset against said backing plate for connection thereto.

11. The combination of claim 9 wherein said spring elements are spring fasteners sprung between said backing plate and the adjacent ends of said studs.

12. The combination of claim 6 wherein said studs are adapted to be affixed to said backing plate, and said spring elements comprise spring tension fasteners connected between the front face of said plate of said brake lining and the adjacent ends of said studs.

13. For use in a brake shoe having a rigid backing plate, the combination comprising: pad means of rubberlike material adapted to be pressed against a face of said plate; a brake lining adapted to compress said pad means; guide means adapted to extend normal to said face and guiding movement of brake lining in a direction normal to said face; and a plurality of spring elements adapted to bias said brake lining to compress said pad means.

14. For use in a railway disk brake provided with a brake shoe having a flat rigid backing plate adapted to receive a brake applying thrust and the braking reaction forces resulting therefrom, the combination comprising: a brake lining adapted to be disposed adjacent to said backing plate, said brake lining comprising a plurality of blocks of braking material arranged in pairs wherein each pair is angularly spaced from each adjacent pair and, in each pair, said blocks are spaced radially apart; said brake lining further comprising a sheet metal plate having a plurality of block supporting sections arranged in the pattern of said blocks and connected thereto, said sheet metal plate further having a plurality of first sections extending between adjacent radially spaced block supporting sections and a plurality of second sections extending between adjacent angularly-spaced block supporting sections whereby said block supporting sections are interconnected but can tilt to a limited extent independently of each other; rubberlike pad means abutting said sheet metal plate and adapted to be compressed between said sheet metal plate and said backing plate; a plurality of studs extending substantially perpendicular to said second sections of said sheet metal plate and adapted to transmit the braking reaction forces from said brake lining to said backing plate; and a plurality of spring elements each connected to a different one of said studs and biasing said second sections against said pad means in opposition to the bias of said pad means whereby each of said second sections is resiliently mounted for movement from a balanced position both towards and away from said backing plate so as to facilitate equalization of braking pressures on said blocks.

15. The combination of claim 14 wherein said studs are integral with one of said plates and engage the other of said plates, said other plate being provided with bearing areas slidably engaged with said studs and guiding movement of said second sections without excessive wear thereof.

References Cited by the Examiner

UNITED STATES PATENTS

| | | | |
|---|---|---|---|
| 1,729,140 | 9/29 | Thompson. | |
| 1,857,530 | 5/32 | Dandrige. | |
| 1,914,490 | 6/33 | Dodge. | |
| 1,971,881 | 8/34 | Tinnerman | 85—36 |
| 1,974,561 | 9/34 | Cunningham | 188—234 |
| 2,030,565 | 2/36 | Bilde. | |
| 2,230,414 | 2/41 | Piron. | |
| 2,451,326 | 10/48 | Eksergian et al. | 188—234 |
| 2,451,329 | 10/48 | Gaenssle | 188—234 |
| 2,553,824 | 5/51 | Kelley | 188—240 |
| 2,943,713 | 7/60 | Salak et al. | 188—240 X |

MILTON BUCHLER, *Primary Examiner.*

EUGENE G. BOTZ, ARTHUR L. LA POINT,
*Examiners.*